(12) United States Patent
Klein et al.

(10) Patent No.: US 7,374,650 B2
(45) Date of Patent: *May 20, 2008

(54) CATHODIC ELECTRODEPOSITION COATING AGENTS CONTAINING BISMUTH SALTS TOGETHER WITH YTTRIUM AND/OR NEODYMIUM COMPOUNDS, PRODUCTION AND USE THEREOF

(75) Inventors: Klausjoerg Klein, Wuppertal (DE); Horst Lehmann, Wuppertal (DE)

(73) Assignee: E.I. du Pont de Nemours & Company, Wilmington, DE (US)

( * ) Notice: Subject to any disclaimer, the term of this patent is extended or adjusted under 35 U.S.C. 154(b) by 692 days.

This patent is subject to a terminal disclaimer.

(21) Appl. No.: 10/643,395

(22) Filed: Aug. 18, 2003

(65) Prior Publication Data

US 2004/0106710 A1    Jun. 3, 2004

Related U.S. Application Data

(60) Provisional application No. 60/405,198, filed on Aug. 22, 2002.

(51) Int. Cl.
*C25D 13/10* (2006.01)

(52) U.S. Cl. .................. 204/489; 204/499; 523/901

(58) Field of Classification Search ........ 204/471–521; 524/901
See application file for complete search history.

(56) References Cited

U.S. PATENT DOCUMENTS

| | | | |
|---|---|---|---|
| 5,554,700 A | 9/1996 | Schipfer et al. |
| 5,670,441 A | 9/1997 | Foedde et al. |
| 5,702,581 A | 12/1997 | Kerlin et al. |
| 5,908,912 A | 6/1999 | Kollah et al. |
| 5,936,013 A | 8/1999 | Foela et al. |
| 5,972,189 A | 10/1999 | McMurdie et al. |
| 6,174,422 B1 | 1/2001 | Hönig et al. |
| 6,265,079 B1 | 7/2001 | Nishiguchi et al. |
| 2003/0054193 A1* | 3/2003 | McCollum et al. ......... 428/626 |

FOREIGN PATENT DOCUMENTS

| | | |
|---|---|---|
| EP | 1 041 125 A1 | 4/2000 |
| WO | WO 96/10057 | 4/1996 |
| WO | WO 00/47642 | 8/2000 |
| WO | WO 00/50522 | 8/2000 |
| WO | WO 00/64991 | 11/2000 |
| WO | WO 01/51570 | 7/2001 |

* cited by examiner

*Primary Examiner*—Kishor Mayekar

(57) ABSTRACT

Waterborne cathodic electrodeposition (CED) coating agents comprising resin solids and optionally pigments, fillers, organic solvents and conventional coating additives, wherein said CED coating agents comprise at least one bismuth salt selected from the group consisting of bismuth hydroxycarboxylic acid salts and bismuth sulfonic acid salts in a quantity of 0.1 to 2.5 wt-%, calculated as bismuth and relative to resin solids content, together with at least one compound selected from the group consisting of yttrium and neodymium compounds in a quantity of 0.1 to 1 wt-%, calculated as metal and relative to resin solids content.

8 Claims, No Drawings

CATHODIC ELECTRODEPOSITION COATING AGENTS CONTAINING BISMUTH SALTS TOGETHER WITH YTTRIUM AND/OR NEODYMIUM COMPOUNDS, PRODUCTION AND USE THEREOF

PRIORITY

This application claims priority from Provisional U.S. Patent Application Ser. No. 60/405,198, filed Aug. 22, 2002, incorporated herein by reference.

FIELD OF THE INVENTION

The invention relates to cathodic electrodeposition (CED) coating agents containing bismuth salts together with yttrium and/or neodymium compounds and to the production of such coating agents and to the use thereof in processes for coating electrically conductive substrates by cathodic electrodeposition coating.

BACKGROUND OF THE INVENTION

The use of various bismuth salts as a catalyzing and/or corrosion protection constituent in lead-free CED coating agents is described repeatedly in the patent literature, for example, in U.S. Pat. Nos. 5,936,013, 5,702,581, 5,554,700, 5,908,912, 6,174,422, 5,670,441, WO 96/10057, U.S. Pat. No. 5,972,189, WO 00/50522, U.S. Pat. No. 6,265,079, EP 1 041 125, WO 00/47642, WO 01/51570.

WO 00/64991 discloses CED coating agents which contain yttrium compounds as the corrosion protection constituent.

None of the above-stated literature references discloses the simultaneous use of bismuth salts and yttrium and/or neodymium compounds in CED coating agents.

One problem in CED coating is the loss of edge coverage when baking the CED coating layer previously deposited onto an electrically conductive substrate. On baking, the CED coating layer draws back from the edges of the substrate, becoming thinner at or in the immediate vicinity of the edges. In extreme cases, edge coverage is inadequate after baking and the corrosion protective action on or in the area of the edges is impaired or lost. Hitherto, known measures for improving the edge protection of CED coating layers, such as the addition of high molecular weight binders or microgels to the CED coating agent or increasing the pigment content in the CED coating agent, all share the disadvantage of increasing the roughness of the baked CED coating layer.

The object of the invention is to provide CED coating agents with good corrosion protection and good edge corrosion protection. The CED coating agents should on deposition and baking provide CED coating layers having a low roughness. In the case of a subsequent coating to be applied onto the CED coating layers, for example, a multi-layer coating as conventional in automotive coating, low roughness of the CED coating layer acting as corrosion protection primer is a favorable precondition for a good appearance of the outer surface of the subsequent multi-layer coating.

SUMMARY OF THE INVENTION

It has been found that the object of the invention may be achieved with aqueous CED coating agents which contain binders, optionally together with cross-linking agents, pigments, fillers (extenders), organic solvents and/or conventional coating additives and which contain at least one bismuth salt selected from the group consisting of bismuth hydroxycarboxylic acid salts and bismuth sulfonic acid salts in a quantity of 0.1 to 2.5 wt-%, calculated as bismuth and relative to resin solids content together with at least one yttrium and/or neodymium compound in a quantity of 0.1 to 1 wt-%, calculated as metal and relative to resin solids content.

DETAILED DESCRIPTION OF THE EMBODIMENTS

The CED coating agents according to the invention, even when un-pigmented, on deposition and baking of a CED coating layer, exhibit a good level of corrosion protection and good edge corrosion protection and also exhibit a low level of roughness or in other words, they do not exhibit an elevated level of roughness.

The CED coating agents according to the invention comprise per se known waterborne cathodically depositable electrodeposition coatings which, in addition contain the at least one bismuth salt and the at least one yttrium and/or neodymium compound as additives.

The CED coating agents are aqueous coating compositions with a solids content of, for example, 10 to 30 wt-%. The solids content consists of the resin solids content, of the content of bismuth salt(s) together with yttrium and/or neodymium compound(s) essential to the invention, optionally present pigments and/or fillers and additional non-volatile additives and preferably does not contain lead compounds and particularly, preferably, also does not contain tin compounds. The resin solids are composed of conventional self- or externally cross-linking CED binder(s) carrying cationic substituents or substituents which can be converted to cationic groups, optionally, present are cross-linking agent(s) and optionally, present are other resin(s) contained in the CED coating agent, such as, paste resin(s). The cationic groups may be cationic groups or basic groups which can be converted to cationic groups, e.g., amino, ammonium, e.g., quaternary ammonium, phosphonium and/or sulfonium groups. Binders having basic groups are preferred. Nitrogen-containing basic groups, such as, amino groups are particularly preferred. These groups may be present in the quaternized form or they are converted to cationic groups with a conventional neutralizing agent, such as, amidosulfuric acid or methanesulfonic acid, lactic acid, formic acid, acetic acid.

The cationic or basic binders may be resins containing, for example, primary, secondary and/or tertiary amino groups, the amine values of which are, e.g., 20 to 250 mg KOH/g. The weight-average molecular mass (Mw) of the CED binders is preferably 300 to 10,000. There are no restrictions on the CED binders that can be used. The various CED binders or CED binder/cross-linking agent combinations known, for example, from the extensive patent literature may be used. Examples of such CED binders include amino(meth)acrylate resins, amino epoxy resins, amino epoxy resins with terminal double bonds, amino epoxy resins with primary OH groups, amino polyurethane resins, amino group-containing polybutadiene resins or modified epoxy resin/carbon dioxide/amine reaction products. These binders may be self-cross-linking or they may be used in combination with cross-linking agents known to the skilled person. Examples of such cross-linking agents include aminoplast resins, blocked polyisocyanates, cross-linking agents with terminal double bonds, polyepoxide compounds, cross-linking agents with cyclic carbonate groups or cross-linking agents that contain groups capable of transesterification and/or transamidization.

The CED binders may be converted to CED binder dispersions and used as such for the preparation of CED coating agents. The preparation of CED binder dispersions is known to the skilled person. For example, CED binder dispersions may be prepared by converting CED binders to an aqueous dispersion by neutralization with acid and dilution with water. The CED binders may also be present in mixture with cross-linking agents and converted together with these to an aqueous CED binder dispersion. If present, organic solvent(s) may be removed to the desired content before or after conversion to the aqueous dispersion, for example, by vacuum distillation.

In addition to the binder(s) and optionally present cross-linking agent(s), water and the at least one bismuth salt and the at least one yttrium and/or neodymium compound, the CED coating agents may also contain pigments, fillers, organic solvents and/or conventional coating additives.

Examples of pigments and fillers include the conventional inorganic and/or organic colored pigments and/or special-effect pigments and/or fillers such as, e.g., titanium dioxide, iron oxide pigments, carbon black, phthalocyanine pigments, quinacridone pigments, metallic pigments, interference pigments, kaolin, talc, silica. The pigment plus filler/resin solids weight ratio of the CED coating agents is, for example, from 0:1 to 0.8:1, and for pigmented coating agents it is preferably from 0.05:1 to 0.4:1.

Examples of organic solvents which may be used in the CED coating bath in amounts of, for example, up to 5 wt. % include polar aprotic water-miscible solvents such as, N-methylpyrrolidone, dimethyl sulfoxide, dimethyl formamide, sulfolane; alcohols, such as, cyclohexanol, 2-ethylhexanol, butanol; glycol ethers, such as, methoxypropanol, ethoxypropanol, butoxyethanol, diethylene glycol diethyl ether; ketones, such as, methyl isobutyl ketone, methyl ethyl ketone, cyclohexanone; hydrocarbons.

Examples of conventional coating additives which may be used in the CED coating agents in amounts of, for example, 0.1 wt. % to 5 wt. %, based on the resin solids, include wetting agents, neutralizing agents, anti-crater agents, leveling agents, antifoaming agents, light stabilizers and antioxidants.

The CED coating agents according to the invention contain as an additive at least one bismuth salt selected from among bismuth hydroxycarboxylic acid salts and bismuth sulfonic acid salts. Preferred examples of such bismuth salts are aliphatic bismuth hydroxycarboxylic acid salts, such as, bismuth lactate, bismuth dimethylolpropionate, bismuth amidosulfonate and bismuth hydrocarbylsulfonates, among the latter in particular bismuth alkylsulfonates, especially bismuth methanesulfonate.

The proportion of the at least one bismuth salt added to the CED coating agent is 0.1 to 2.5 wt-%, preferably 0.5 to 2 wt-%, calculated as bismuth and relative to resin solids content of the CED coating agent.

In addition to the at least one bismuth salt, the CED coating agents according to the invention contain at least one yttrium and/or neodymium compound as an additional additive. Examples are in particular yttrium and/or neodymium salts, for example, corresponding sulfates, nitrates, carboxylic acid salts and hydrocarbylsulfonates, such as, alkylsulfonates.

The proportion of the at least one yttrium and/or neodymium compound added to the CED coating agent is 0.1 to 1 wt-%, preferably 0.15 to 0.5 wt-%, calculated as metal and relative to resin solids content of the CED coating agent.

The CED coating agents according to the invention have only a trace content of dissolved yttrium and/or neodymium, specifically less than 5 mg of yttrium and/or neodymium ions per litre of ready-to-apply CED coating agent or ready-to-apply CED coating bath. This is shown by analysis by both atomic absorption spectroscopy and ion chromatography of dialysate or ultrafiltrate of the ready-to-apply CED coating agent.

The at least one bismuth salt as well as the at least one yttrium and/or neodymium compound may be added to the CED coating agent by various methods and in each case at the same or different points during the production of the CED coating agents. For example, the at least one bismuth salt as well as the at least one yttrium and/or neodymium compound may be added to an optionally already neutralized CED binder or an optionally already neutralized CED binder solution before the addition of substantial quantities of water and then be homogenized by stirring. When appropriate hydroxycarboxylic or sulfonic acids are used as neutralizing agents for the binder, it is alternatively possible with regard to the at least one bismuth salt and optionally, also with regard to the at least one yttrium and/or neodymium compound, for example, to use bismuth oxide, hydroxide or carbonate or yttrium and/or neodymium oxide, hydroxide or carbonate, wherein the corresponding bismuth or corresponding yttrium and/or neodymium salts are formed in situ; in this case, it is advantageous to use an appropriately adjusted increased quantity of acid relative to the quantity of acid required to neutralize the CED binder.

It is also possible to add the at least one bismuth salt and/or the at least one yttrium and/or neodymium compound to the finished aqueous CED binder dispersion or to the finished, ready-to-apply CED coating agent, for example as an aqueous bismuth salt solution or as an aqueous yttrium and/or neodymium salt solution.

Irrespective of whether the CED coating agents are pigmented or unpigmented, they may be prepared by known methods for the preparation of CED coating baths, i.e., in principle both by means of the one-component and the two-component procedure.

In the case of the one-component procedure for the preparation of pigmented CED coating agents, one-component concentrates are prepared by dispersing and optionally grinding pigments and/or fillers in CED binder optionally, containing crosslinker, for example, in an organic solution of a CED binder or of a paste resin, optionally, followed by the addition of further make-up CED binder to the mill base. The CED coating agent or bath may then be prepared from this material by dilution with water after the addition of acid as neutralizing agent—unless this has already been carried out. In the case of solids compensation of the CED coating bath, unlike the fresh preparation of a CED coating bath, mixing is carried out not with water but with CED coating bath contents depleted of solids due to CED coating. The addition, which is essential to the invention, of at least one bismuth salt and of at least one yttrium and/or neodymium compound may here by carried out at any desired point or using any of the methods of addition described above.

Un-pigmented CED coating agents may be prepared in a similar manner by the one-component procedure in which case the addition and dispersion of pigments or fillers is, by definition, left out.

In the two-component procedure for the preparation of pigmented or un-pigmented CED coating agents, (a) at least one CED binder dispersion is mixed as one component with (b) at least one additional, optionally pigmented (optionally containing pigments and/or fillers) component to obtain a CED coating agent, with the additional possibility of adding water to adjust the solids. A pigmented component (b) is, in particular, a pigment and/or filler paste (b1). Pigment and/or filler pastes (b1) may be prepared in the usual manner by dispersing and optionally grinding pigments and/or fillers in CED binders, preferably in conventional paste resins known to the skilled person. Examples of unpigmented components (b) include additive preparations (b2), for example, aqueous or organic solutions, aqueous emulsions or aqueous or organic suspensions of additives. The at least one bismuth salt and the at least one yttrium and/or neodymium compound may be a constituent of the CED binder dispersion (a) and/or of a pigment and/or filler paste (b1) and/or of an additive preparation (b2). A CED binder dispersion (a) containing at least one bismuth salt and/or at least one yttrium and/or neodymium compound may be produced by adding the at least one bismuth salt and/or the at least one yttrium and/or neodymium compound, for example, to a CED binder present in a non-aqueous phase and, after addition of acid as neutralizing agent provided that this has not already been performed, converting the salt or compound together with said binder into a corresponding CED binder dispersion (a) by dilution with water. A pigment and/or filler paste (b1) containing at least one bismuth salt and/or at least one yttrium and/or neodymium compound may, for example, be produced by dispersing and optionally grinding pigments and/or fillers together with the at least one bismuth salt and/or the at least one yttrium and/or neodymium compound in CED binder or paste resin or by mixing a CED binder containing at least one bismuth salt and/or at least one yttrium and/or neodymium compound with a previously produced pigment paste. The additive preparations (b2), which may contain at least one bismuth salt and/or at least one yttrium and/or neodymium compound as the only additive(s) or together with at least one other conventional coating additive, may comprise appropriate aqueous or organic preparations, for example emulsions, suspensions or solutions.

In the case of solids compensation, unlike the fresh preparation of a CED coating bath, the components (a) and (b) are not diluted with water but mixed with CED coating bath contents depleted in solids due to CED coating.

CED coating layers, for example, in a dry layer thickness of 10 µm to 30 µm, may be deposited in the usual way from the CED coating agents onto electrically conductive, particularly, metallic substrates connected up as the cathode.

Metal substrates used may be parts made of all conventional metals, for example, the metal parts usually used in the automotive industry, particularly automotive bodies and parts thereof. Examples include components of aluminum, magnesium or alloys thereof and, in particular, galvanized or non-galvanized steel. Before CED coating, the metal substrates may undergo a conversion treatment, for example, they may be, in particular, phosphated and optionally, passivated.

Corrosion protection of primers deposited on, for example, steel, from the CED coating agents according to the invention is also outstanding on bright steel or on merely phosphated non-passivated steel. The various substrates may be present together on one workpiece (mixed construction). Similarly, metal parts, which have already been partially or wholly pre-coated, or plastic parts, may be present on the workpiece.

After coating with the CED coating agent according to the invention, the CED coating is cross-linked by baking, e.g., at object temperatures from 130° C. to 200° C. The CED coating layers may be unbaked or, after baking, provided with one or more further coating layers, for example, a top coat layer or a multi-layer coating comprising, for example, a surfacer layer, base coat layer and clear coat layer.

The purpose of the following Examples is to illustrate the present invention in greater detail. In order to eliminate the distorting influence of pigment content on roughness measurements of the baked CED coating layers, the CED coating layers were deposited from CED clear coats.

EXAMPLES

Example 1

Production of Bismuth Hydroxycarboxylic Acid Salts

Deionized water and hydroxycarboxylic acid were initially introduced and heated to 70° C. Bismuth oxide ($Bi_2O_3$) was added in portions while the mixture was stirred. After an additional 6 hours of stirring at 70° C., the batch was cooled to approximately 20° C. and left to stand unstirred for 12 hours. Finally, the precipitate was filtered out, washed with a little water and ethanol and dried at a temperature of 40 to 60° C.

The following salts were produced using the stated proportions:

Bismuth Lactate
  466 parts (1 mol) of bismuth oxide+901 parts (7 mol) of lactic acid, 70% in water Bismuth Dimethylolpropionate:
  466 parts (1 mol) of bismuth oxide+938 parts (7 mol) of dimethylolpropionic acid+2154 parts of water Example 2

Production of Bismuth Methanesulfonate

A mixture of 296 g of deionized water and 576 g (6 mol) of methanesulfonic acid was initially introduced and heated to 80° C. 466 g (1 mol) of bismuth oxide ($Bi_2O_3$) were added in portions while the mixture was stirred. After 3 hours, a turbid liquid is obtained which, on dilution with 5400 g of deionized water, gives rise to an opalescent solution. The residue left on evaporation of the solution is bismuth methanesulfonate.

Example 3

Preparation of CED Coating Dispersions a) 832 parts of the monocarbonate of an epoxy resin based on bisphenol A (commercial product Epikote® 828) were mixed with 830 parts of a commercial polycaprolactone polyol (commercial product CAPA 205) and 712 parts of diglycol dimethylether and reacted at 70° C. to 140° C. with 0.3% $BF_3$-etherate as catalyst until an epoxy value of 0 was obtained. In the presence of 0.3% Zn acetyl acetonate as catalyst, 307 parts of a reaction product of 174 parts of toluene diisocyanate and 137 parts of 2-ethyl hexanol were added to this product at 40° C. to 80° C. with the addition of 0.3% benzyl trimethylammonium hydroxide. The reaction was continued until an NCO value of about 0 was obtained and the mixture then adjusted to a solids content of 70 wt. % with diglycol dimethyl ether.

b) 618 parts of a reaction product of 348 parts of toluene diisocyanate and 274 parts of 2-ethyl hexanol were added slowly to 1759 parts of a biscarbonate of an epoxy resin based on bisphenol A (commercial product Epikote® 1001) at 60° C. to 80° C. with the addition of 0.3% benzyl trimethylammonium hydroxide. The reaction was continued to an NCO value of about 0.

c) At a temperature of 20° C. to 40° C., 622 parts of the reaction product of 137 parts of 2-ethylhexanol with 174 parts of toluene diisocyanate with benzyltrimethylammonium hydroxide catalysis (0.3%) were added to 860 parts of bishexamethylene triamine dissolved in 2315 parts of methoxy propanol and the reaction was continued until an NCO content of about 0 was obtained. Then 4737 parts of the reaction product b) and 3246 parts of the reaction product a) (in each case 70% in diglycol dimethyl ether) were added and reacted at 60° C. to 90° C. The reaction was ended at an amine value of about 32 mg KOH/g. The product obtained was distilled under vacuum to a solids content of about 85%.

d1) Neutralization was carried out with 30 mmole of formic acid/100 g of resin. The mixture was then heated to 70° C. and bismuth lactate was added in portions, with stirring, over a period of two hours, in an amount such that 1 wt. % of bismuth, based on resin solids content, was present in the mix. Stirring was then continued for another 6 hours at 60° C. to 70° C. After cooling, the mixture was converted with deionized water to a dispersion with a solids content of 40 wt. %.

d2) The same method was used as described in d1), except that bismuth methanesulfonate (from Example 2) was used instead of bismuth lactate.

d3) The same method was used as described in d1), except that no bismuth salt was added.

d4) The same method was used as described in d1), except that, instead of bismuth lactate, dibutyltin diacetate was added in a quantity such that 1 wt-% of tin, calculated as metal and relative to the resin solids content in the batch, was present.

Comparative Example 4a

Production of a CED Clear Coat Containing Bismuth Lactate 815.5 parts of the dispersion from Example 3 d1) were adjusted with 50 wt-% aqueous formic acid to an meq value of 45 mmol of acid/100 g of solids and diluted to a solids content of 15 wt-% with deionized water.

Comparative Example 4b

Production of a CED Clear Coat Containing Bismuth Methanesulfonate 815.5 parts of the dispersion from Example 3 d2) were adjusted with 50 wt-% aqueous formic acid to an meq value of 45 mmol of acid/100 g of solids and diluted to a solids content of 15 wt-% with deionized water.

Comparative Example 4c

Production of a Metal-Free CED Clear Coat 815.5 parts of the dispersion from Example 3 d3) were adjusted with 50 wt-% aqueous formic acid to an meq value of 45 mmol of acid/100 g of solids and diluted to a solids content of 15 wt-% with deionized water.

Comparative Example 4d

Production of a CED Clear Coat Containing Dibutyltin Diacetate 815.5 parts of the dispersion from Example 3 d4) were adjusted with 50 wt-% aqueous formic acid to an meq value of 45 mmol of acid/100 g of solids and diluted to a solids content of 15 wt-% with deionized water.

Comparative Example 4e

Production of a CED Clear Coat Containing Yttrium Acetate

The same method was used as in Comparative Example 4c, except that, prior to addition of the 50 wt-% aqueous formic acid, 10 wt-% aqueous yttrium acetate solution was added in a quantity such that 0.3 wt-% of yttrium, calculated as metal and relative to resin solids, were present.

Comparative Example 4f

Production of a CED Clear Coat Containing Neodymium Methanesulfonate

The same method was used as in Comparative Example 4c, except that, prior to addition of the 50 wt-% aqueous formic acid, 8 wt-% aqueous neodymium methanesulfonate solution (produced by reacting neodymium oxide and methanesulfonic acid in water) was added in a quantity such that 0.3 wt-% of neodymium, calculated as metal and relative to resin solids, were present.

Example 4g According to the Invention

Production of a CED Clear Coat Containing Bismuth Lactate and Yttrium Acetate as Additions The same method was used as in Comparative Example 4a, except that, prior to addition of the 50 wt-% aqueous formic acid, 10 wt-% aqueous yttrium acetate solution was added in a quantity such that 0.3 wt-% of yttrium, calculated as metal and relative to resin solids, were present.

Example 4h According to the Invention

Production of a CED Clear Coat Containing Bismuth Methanesulfonate and Yttrium Acetate as Additions The same method was used as in Comparative Example 4b, except that, prior to addition of the 50 wt-% aqueous formic acid, 10 wt-% aqueous yttrium acetate solution was added in a quantity such that 0.3 wt-% of yttrium, calculated as metal and relative to resin solids, were present.

Example 4i According to the Invention

Production of a CED Clear Coat Containing Bismuth Methanesulfonate and Neodymium Methanesulfonate as Additions The same method was used as in Comparative Example 4b, except that, prior to addition of the 50 wt-% aqueous formic acid, 8 wt-% aqueous neodymium methanesulfonate solution was added in a quantity such that 0.3 wt-% of neodymium, calculated as metal and relative to resin solids, were present.

Degreased, unphosphated metal test sheets (Ra value=1.5 μm) were provided with a 20 μm thick CED coat from CED clear coat baths 4a-i (coating conditions: 2 minutes at 32° C. at a deposition voltage of 260 V; baking conditions: 20 minutes, 175° C. object temperature). The clear coat layers deposited from CED clear coats 4c, 4e and 4f were not fully cured and were thus not subjected to the technical testing. The roughness of all the other baked CED clear coat layers was measured as an Ra value (DIN 4777, using T500 Lommel-Tester, cut-off 2.5 mm, 15 mm measurement path). Corrosion protection action on the surface was also investigated. To this end under-film rust creepage (in mm on one side) at a cut was determined after 240 hours of salt spray testing (to DIN 50 021-SS in conjunction with DIN 53 167).

Perforated (perforation diameter 10 mm), degreased, unphosphated metal test sheets were also coated in an entirely similar manner and then exposed to salt spray conditions to DIN 50 021-SS for 144 hours. The edges of the perforations were evaluated for edge rusting (ratings KW 0 to 5: KW 0=no rust on edges; KW 1=isolated rust spots on edges; KW 2=rust spots on less than ⅓ of edges; KW 3=⅓ to ⅔ of edges covered with rust; KW 4=more than ⅔ of edges covered with rust; KW 5=edges completely rusty).

| CED clear coat under test | Corrosion protection; creepage at a cut in mm (one side) | Edge rusting, rating | Roughness (Ra value in μm) |
| --- | --- | --- | --- |
| 4a, Comparison | 2.5 | 4 | 0.40 |
| 4b, Comparison | 2.0 | 4 | 0.41 |
| 4d, Comparison | 4.0 | 5 | 0.39 |
| 4g, according to the invention | 1.5 | 2-3 | 0.42 |
| 4h, according to the invention | 1.5 | 2 | 0.40 |
| 4i, according to the invention | 2.0 | 3 | 0.39 |

Only Examples 4g, h, i (the invention) exhibited good corrosion protection in general as well as good edge corrosion protection and they did not exhibit elevated roughness.

What is claimed is:

1. Waterborne cathodic electrodeposition (CED) coating agents comprising resin solids and optionally pigments, fillers, organic solvents and conventional coating additives, wherein said CED coating agents comprise at least one bismuth salt selected from the group consisting of bismuth hydroxycarboxylic acid salts and bismuth sulfonic acid salts in a quantity of 0.1 to 2.5 wt-%, calculated as bismuth and relative to resin solids content, together with at least one compound selected from the group consisting of yttrium and neodymium compounds in a quantity of 0.1 to 1 wt-%, calculated as metal and based on resin solids content.

2. The CED coating agents of claim 1, wherein the bismuth hydroxycarboxyic acid salts are selected from the group consisting of bismuth lactate and bismuth dimethylolpropionate and the bismuth sulfonic acid salts are selected from the group consisting of bismuth amidosulfonate and bismuth hydrocarbylsulfonates.

3. The CED coating agents of claim 1, wherein the proportion of the at least one bismuth salt is 0.5 to 2 wt-%, calculated as bismuth and relative to resin solids content.

4. The CED coating agents of claim 1, wherein the yttrium and neodymium compounds comprise salts selected from the group consisting of yttrium sulfate, yttrium nitrate, carhoxylic acid salts of yttrium, hydrocarbylsulfonates of yttrium, neodymium sulfate, neodyniiam nitrate, carboxylic acid salts of neodymium and hydrocarbylsulfonates of neodymium.

5. The CED coating agents of claim 1, wherein the proportion of the at least one compound selected from the group consisting of yttrium and neodymium compounds is 0.15 to 0.5 wt-%. calculated as metal and relative to resin solids content.

6. A process for cathodic electrodeposition coating of an electrically conductive substrates said process comprising electrodepositing a CED coating layer on an electrically conductive substrate connected up as the cathode from the CED coating agent of claim 1.

7. A process according to claim 6, wherein the substrates comprise substrates selected from the group consisting of automotive bodies and body parts.

8. A process for forming the CED coating agents according to claim 1 which comprises adding at least one bismuth salt selected from the group consisting of bismuth hydroxycarboxylic acid salts and bismuth sulfonic acid salts and at least one compound selected from the group of yttrium and neodymium compounds to (CED) coating agents comprising resin solids, and optionally, pigments, fillers, organic solvents and conventional coating additives.

* * * * *